United States Patent Office 3,116,796
Patented Jan. 7, 1964

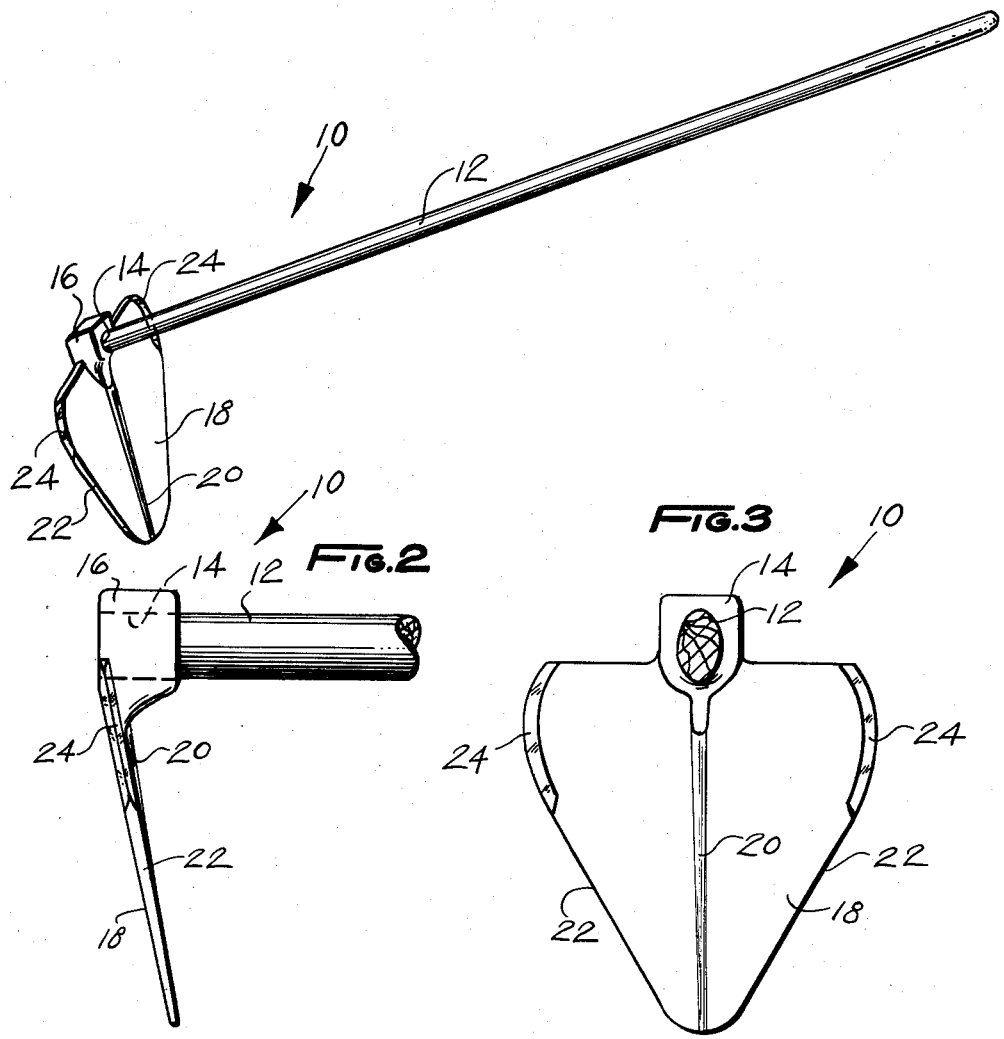

3,116,796
MULTI-PURPOSE AGRICULTURAL HAND TOOL
Andrew Miljan, 3218 Greenpoint Ave.,
Long Island City, N.Y.
Filed Nov. 8, 1962, Ser. No. 236,270
1 Claim. (Cl. 172—371)

This invention relates to hand tools and more particularly to multi-purpose hand tools.

It is an object of the present invention to provide a hand tool which will have a steel working end with an elongated handle which will be useful for cultivating and clearing any kind of soil.

Another object of the present invention is to provide a hand tool which will penetrate heavy rooted soil, or even frozen ground, and cut the roots of trees.

Another object of the present invention is to provide a hand tool which will enable villagers to build roads in a jungle, dig holes for fences in a minimum amount of time and effort while doing so and will use the hammer section for driving the posts into the ground and will level off and tamp the ground solid.

Other objects of the invention are to provide a hand tool bearing the above objects in mind which is of simple construction, has a minimum number of parts, is inexpensive to manufacture and efficient in operation.

For other objects and for a better understanding of the invention reference may be had to the following detailed description taken in conjunction with the accompanying drawing, in which:

FIGURE 1 is a perspective view of a tool comprising the present invention;

FIGURE 2 is an enlarged fragmentary side view of FIGURE 1; and

FIGURE 3 is an end view of FIGURE 2.

Referring now more in detail to the drawing, a hand tool 10 made in accordance with the present invention is shown to include an elongated and oval-shaped configurated handle 12 which is received at one end by an oval shaped configurated opening 41 of a projecting rectangularly configurated hammer head 16 projecting from the upper and central portion of blade 18. Hammer head 16 arcuately tapers downward into flute 20 on the rear face of the blade 18 which provides stiffening means for blade 18. Blade 18 is triangularly configurated and is rounded on the bottom edge and upper corners. Sides 22 are provided with V-shaped configurated knife sharp edges 24 which provide a means for cutting wood and other materials. Blade 18 is angularly offset from hammer head 16 and handle 12.

In operation, handle 12 is held in the hand of the worker in a well known manner and the blade 18 may be used for digging into the ground by lifting handle 12 and then bringing it down. In other operations such as cutting wood or trees, blade 18 is held so that cutting edges 24 will strike the material to be cut with a swinging arcuate motion of the handle 12 by the worker.

When there is a stake or post to be driven handle 12 is rotated by the worker 180 degrees from its spading position and the hammer head 16 having rounded corners projecting downward provides hammering by swinging handle 12 arcuately upward and downward thus the pressure of the mass of blade 18 and its head 16 will provide a smashing blow to the top of a post or stake.

It shall thus be recognized that tool 10 is a combination tool which when held by the worker in various angles will efficiently execute a multiple of operations.

While various changes may be made in the detail construction it shall be understood that such changes shall be within the spirit and scope of the present invention as defined by the appended claim.

What I claim as new and desire to protect by Letters Patent of the United States is:

A multi-purpose hand tool comprising a substantially triangular blade having substantially flat front and rear faces, means forming a handle eye projecting from the free edge of a side forming the base of said triangle and rearwardly from the rear face of the blade, said means being positioned so that the eye extends substantially normal to said rear face midway of said base, a rearwardly projecting handle fitted in said eye, the apex of said substantially triangular blade being formed by an outwardly projecting arcuate portion tangent to the sides of said triangle, each of the corners of said blade adjacent said base being formed by an outwardly extending arcuate portion tangent to its respective triangle side at substantially midway the height of said substantially triangular blade, each of the last said arcuate portions being a knife-like cutting edge, and the mass of said eye means relative to the blade being such that the center of the mass of the tool and the midpoints of the last said arcuate portions are substantially in alignment.

References Cited in the file of this patent

UNITED STATES PATENTS

| 97,863 | Billings | Dec. 14, 1869 |
| 671,107 | Douglas | Apr. 2, 1901 |
| 936,038 | Richards | Oct. 5, 1909 |
| 1,515,217 | Kombol | Nov. 11, 1924 |

FOREIGN PATENTS

| 177,002 | Austria | May 15, 1953 |